(12) United States Patent
Murata et al.

(10) Patent No.: US 10,895,482 B2
(45) Date of Patent: Jan. 19, 2021

(54) DUAL SENSOR TYPE MASS FLOW CONTROLLER

(71) Applicant: FUJIKIN INCORPORATED, Osaka (JP)

(72) Inventors: Takuro Murata, Osaka (JP); Takeshi Nakamura, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/724,675

(22) Filed: Dec. 23, 2019

(65) Prior Publication Data
US 2020/0209033 A1 Jul. 2, 2020

(30) Foreign Application Priority Data
Dec. 27, 2018 (JP) ................ 2018-245026

(51) Int. Cl.
*G01F 1/78* (2006.01)
*G01F 1/708* (2006.01)
*G01F 1/80* (2006.01)

(52) U.S. Cl.
CPC ............ *G01F 1/785* (2013.01); *G01F 1/7084* (2013.01); *G01F 1/80* (2013.01)

(58) Field of Classification Search
CPC .... G01F 1/78; G01F 1/70; G01F 1/69; G05D 7/06
See application file for complete search history.

(56) References Cited

U.S. PATENT DOCUMENTS

| | | | | |
|---|---|---|---|---|
| 7,651,263 B2* | 1/2010 | Zolock | ........... | G01F 1/6847 374/1 |
| 7,874,208 B2* | 1/2011 | Redemann | ........... | G01F 1/6842 73/202 |
| 8,036,780 B2* | 10/2011 | Gotoh | ........... | G05D 7/0635 137/2 |
| 8,504,311 B2* | 8/2013 | Smirnov | ........... | G01F 25/0053 702/45 |
| 9,399,199 B2* | 7/2016 | Dille | ........... | G01F 5/00 |
| 9,970,801 B2* | 5/2018 | Ishii | ........... | G01F 1/684 |
| 10,514,289 B2* | 12/2019 | Ikeuchi | ........... | G01F 5/00 |
| 2015/0260565 A1* | 9/2015 | Smirnov | ........... | G01F 25/0007 73/1.34 |

(Continued)

FOREIGN PATENT DOCUMENTS

JP 2012-226627 11/2012
JP 2016-162064 9/2016

*Primary Examiner* — Jewel V Dowtin
(74) *Attorney, Agent, or Firm* — Greenblum & Bernstein, P.L.C.

(57) ABSTRACT

To provide an MFC capable of improving an S/N ratio of a sensor signal even when a pressure difference between both sides of the MFC is small and a flow rate in the sensor flow path is low. Provided is a mass flow controller including a fluid flow path that allows a fluid to pass therethrough, a plurality of flow sensor units that measure a mass flow rate of the fluid, an adjusting valve that adjusts a flow rate of the fluid passing through the fluid flow path, and a control unit that controls a degree of open of the adjusting valve. The flow sensor units are each a thermal flow sensor unit. The control unit calculates a mass flow rate from an added output signal obtained by adding the output signals of the plurality of flow sensor units, and controls the degree of open of the adjusting valve.

6 Claims, 7 Drawing Sheets

(56) References Cited

U.S. PATENT DOCUMENTS

2016/0003665 A1* 1/2016 Valentine ................ G01F 25/00
  73/1.16
2019/0050003 A1* 2/2019 Banares .................... G01F 1/69

* cited by examiner

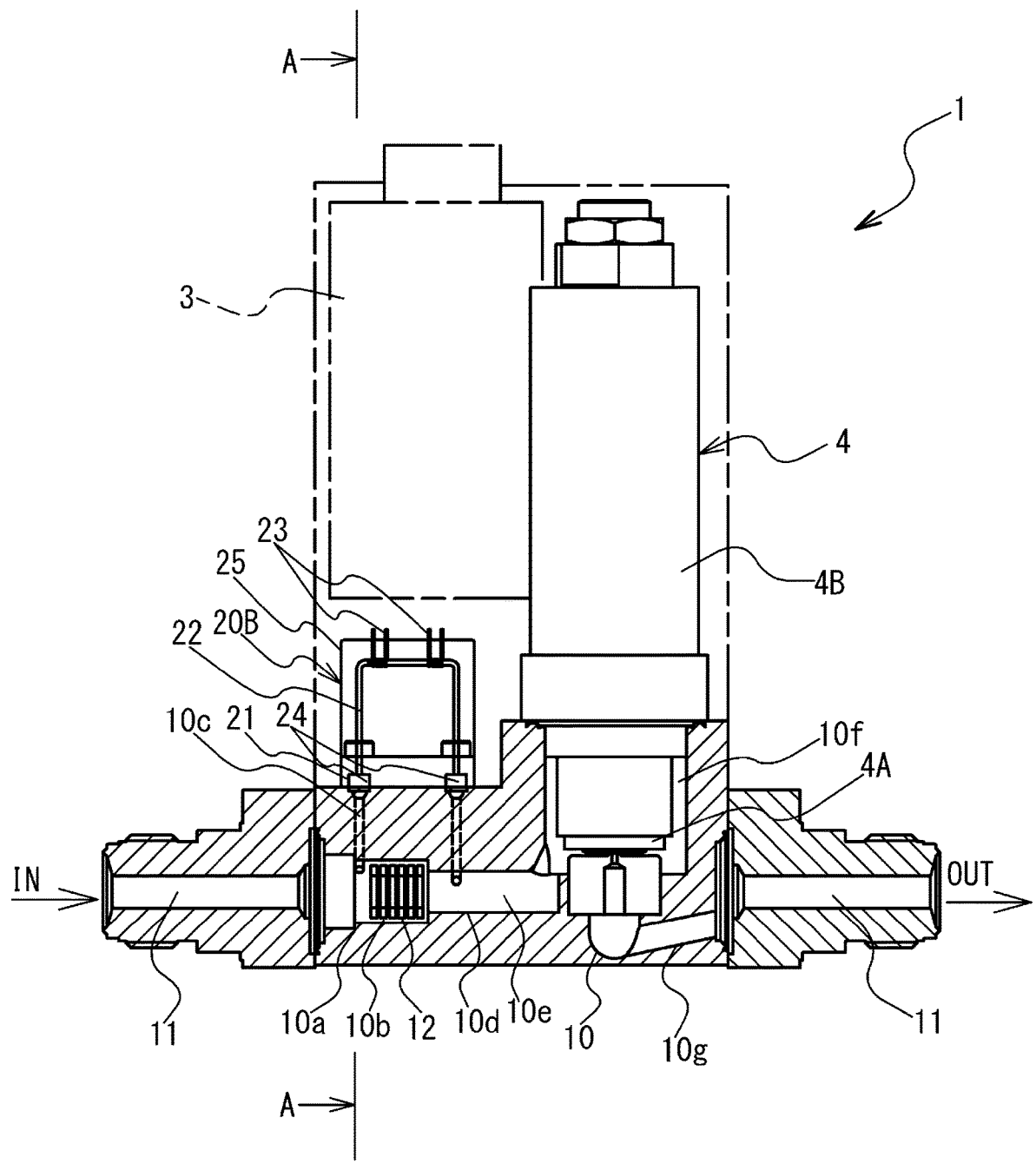
F I G. 1

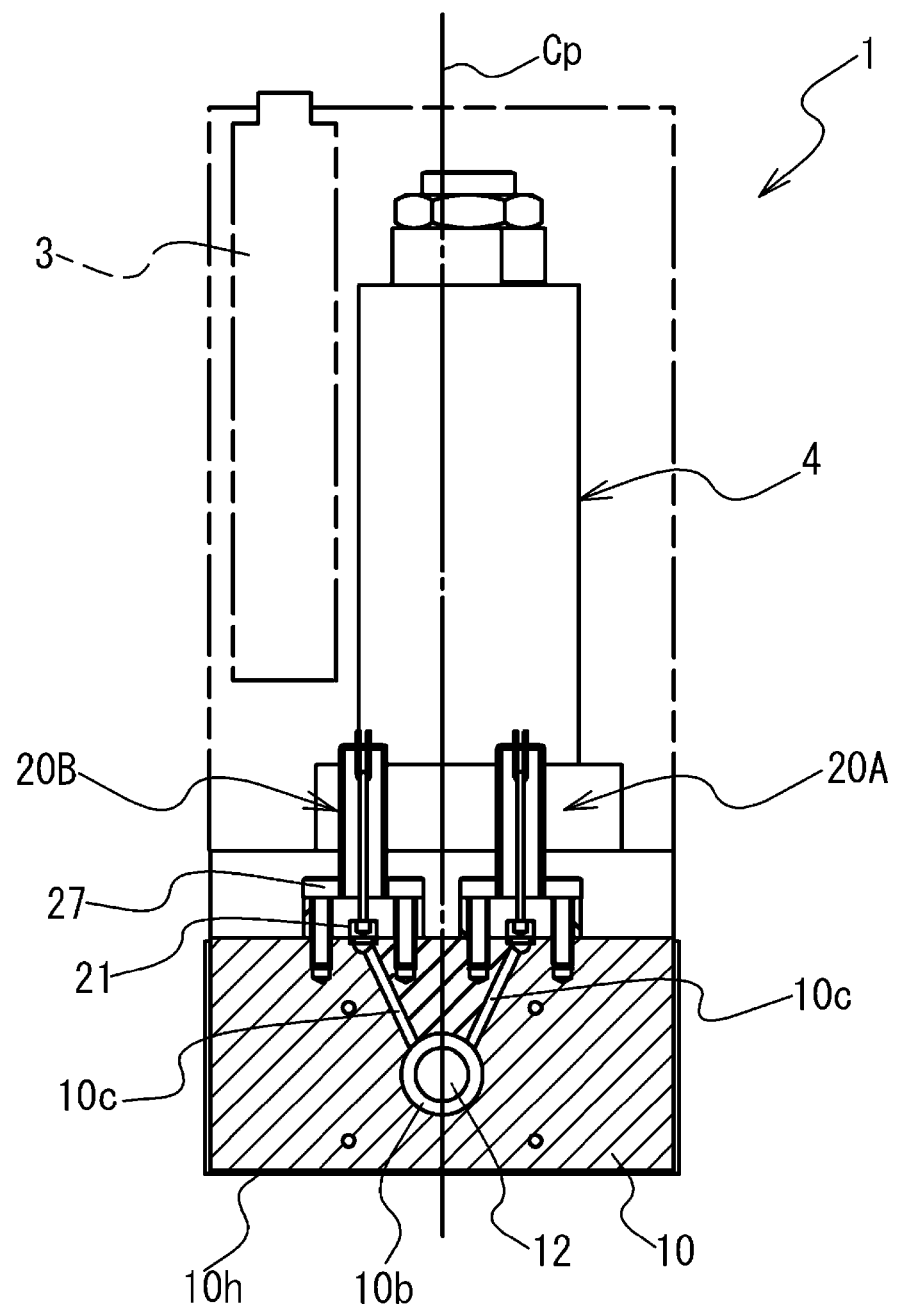
F I G. 2

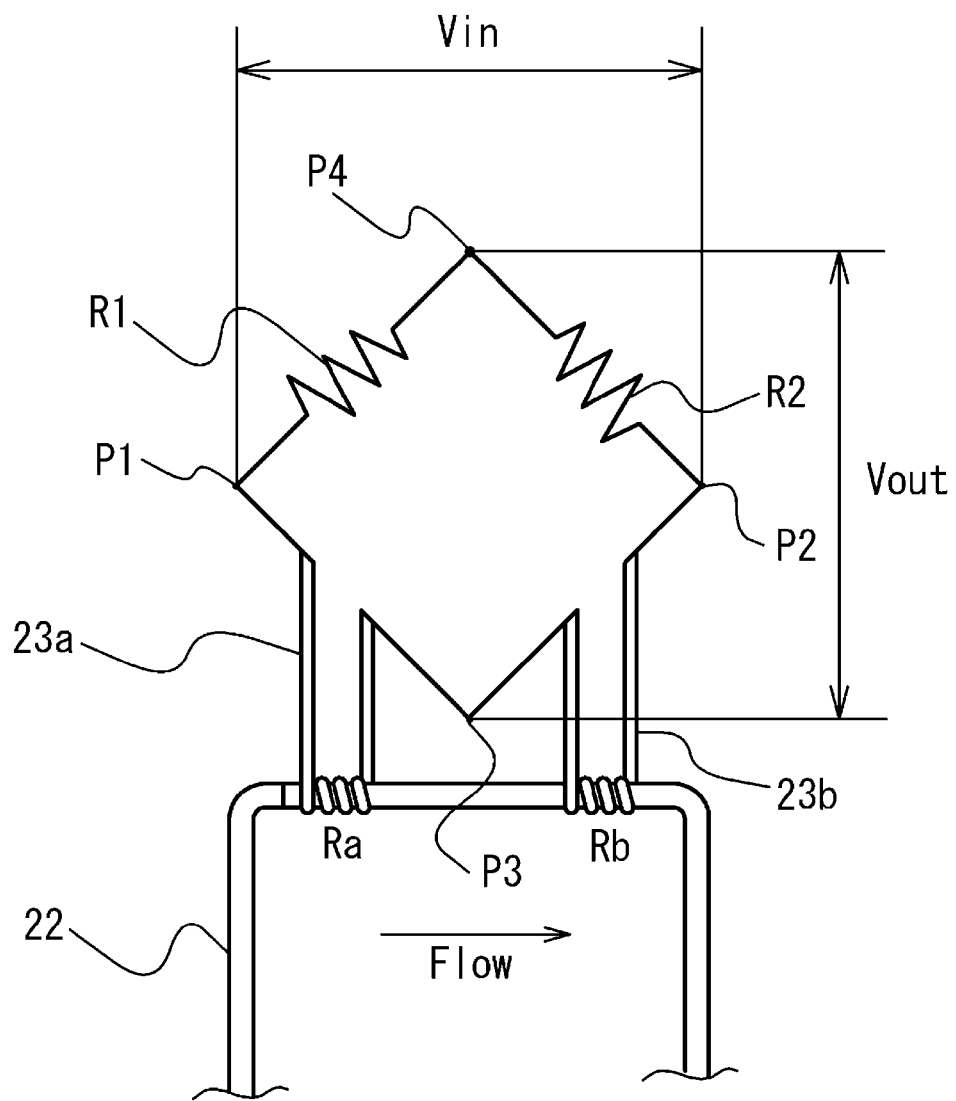
F I G. 3

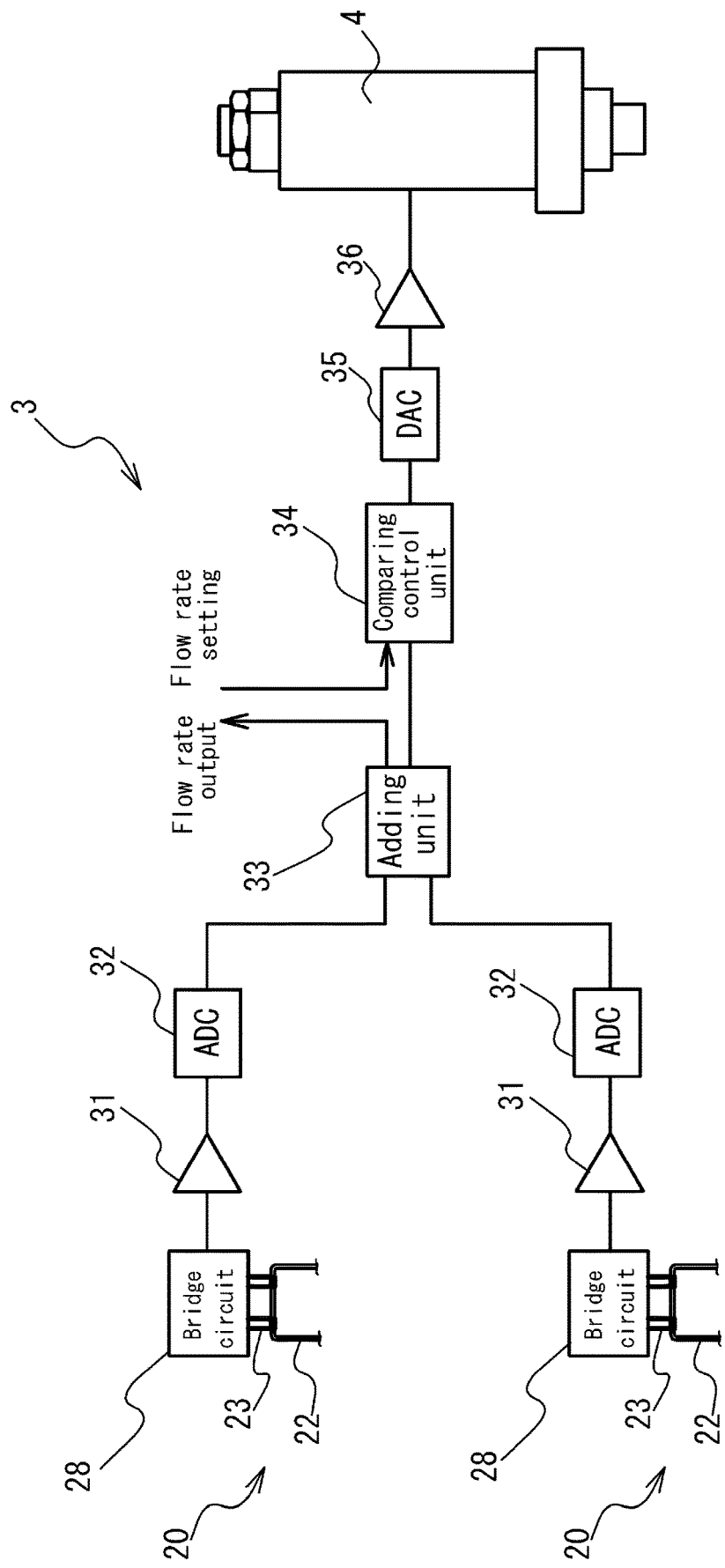
F I G. 4

DUAL SENSOR TYPE MASS FLOW CONTROLLER

FIELD OF THE INVENTION

Cross-Reference to Related Applications

This application is based upon and claims the benefit of priority from the Japanese Patent Application No. 2018-245026, filed Dec. 27, 2018 the entire content of which is incorporated herein by reference.

The present invention relates to a mass flow controller, a fluid control system, and a semiconductor manufacturing system.

DESCRIPTION OF THE BACKGROUND ART

Conventionally, mass flow controllers (MFCs) have been used as mass flow control systems for process gases and the like used in semiconductor manufacturing processes, and thermal MFCs, in particular, are often used for precise flow rate measurement.

This thermal MFC is a device that provides feedback control of an adjusting valve on the basis of a flow rate measured by a thermal flow sensor, and sends a fluid (gas or the like) supplied from a primary side to a secondary side at an instructed flow rate.

The thermal flow sensor includes a sensor flow path for flowing a portion of the fluid passing through the MFC for flow rate measurement and, while electrically heating the fluid flowing through the sensor flow path by heating resistors provided on an upstream side and a downstream side thereof, measures a mass flow rate of the fluid from a temperature difference detected as a resistance value difference between both heating resistors.

The sensor flow path is connected in parallel with a bypass flow path for flowing the other large portion of the fluid and, because the flow rate ratio between the sensor flow path and the bypass flow path is already known and substantially constant regardless of pressure, it is possible to calculate the mass flow rate of the fluid flowing through the MFC from the flow rate detected by the sensor (for example, Patent Document 1).

In such a thermal flow sensor, when the flow rate of the fluid flowing through the sensor flow path is too high, the fluid flowing through the sensor flow path cannot sufficiently receive heat from the heating resistor on the upstream side, or sufficiently transfer the heat to the heating resistor on the downstream side, and an output proportional to the flow rate cannot be obtained as a result.

On the other hand, when the flow rate of the fluid passing through the sensor flow path is too low, a signal-to-noise (S/N) ratio between a voltage $\Delta V$ output from the sensor and a noise caused by the sensor itself (white noise; a winding of the sensor has a resistance value and therefore is a white noise source) decreases, and a measurement accuracy decreases as a result.

For these reasons, thermal flow sensors have a limited applicable flow range.

In Patent Document 2, two flow sensor units having different shapes of the sensor flow path are provided in parallel, and a control unit switches the flow sensor unit from which the signal is adopted according to the flow rate, thereby widening a dynamic range (a ratio between measurable maximum and minimum values).

PATENT DOCUMENTS

Patent Document 1: Japanese Laid-Open Patent Application No. 2016-162064

Patent Document 1: Japanese Laid-Open Patent Application No. 2012-226627

SUMMARY OF THE INVENTION

Problems to be Solved by the Invention

MFCs having an equivalent dynamic range even when the supply pressure is low are in demand. For example, there is a demand for MFCs that realize a maximum flow rate of 1200 sccm at a pressure difference of 300 kPa compared to a conventional MFC that realizes a maximum flow rate of 1200 sccm at a pressure difference of 400 kPa. In an MFC having a small specified pressure difference, the overall flow rate of the MFC can be maintained to a conventional flow rate by reducing the resistance of the bypass flow path, but this inevitably reduces the maximum flow rate (100% flow rate) of the gas flowing through the sensor flow path. However, the measurable minimum flow rate does not change due to electrical noise, resulting in a narrow dynamic range.

A straight forward solution is to change the shape of the sensor flow path and newly produce a flow sensor that can measure a flow rate even with a low pressure difference, but this is impractical for special products with smaller production volumes. In order to produce a new sensor, it is necessary to measure a conversion parameter for converting the sensor output voltage $\Delta V$ to a flow rate Q. This conversion parameter, however, differs depending on the type of gas and thus, to guarantee a sufficient measurement accuracy, parameters must be measured by preparing all gases that can be used with the MFC. In addition, influences of temperature and pressure do not completely agree with theory, and it is necessary to acquire correction values while changing the temperature and operating pressure for all of these gases, resulting in high development costs. Further, from the viewpoint of productivity as well, it is necessary to prepare a stock of multiple types of sensors, and thus it is not desirable. Furthermore, from the viewpoint of product assurance as well, using a sensor without an experience of use is high risk. That is, it is important to suppress the number of sensor types of the thermal MFCs to one to improve product reliability and mass productivity.

Even in the above-described prior art set forth in Patent Document 2, which switches between the two sensor units, the problem arises that a new sensor needs to be produced.

An object of the present invention is to solve such problems and thus provide an MFC capable of improving an S/N ratio of a sensor signal even when a pressure difference between both sides of the MFC is small and a flow rate in the sensor flow path is low.

Means for Solving the Problems

A mass flow controller of the present invention comprises:
a fluid flow path that allows a fluid to pass therethrough,
a plurality of flow sensor units that measure a mass flow rate of the fluid passing through the fluid flow path,
an adjusting valve that adjusts a flow rate of the fluid passing through the fluid flow path, and
a control unit that controls a degree of open of the adjusting valve so that the mass flow rate of the fluid measured by the flow sensor units becomes a predetermined value.

The fluid flow path comprises a bypass flow path constituting a portion thereof.

The flow sensor units each include a sensor flow path branching at a primary side of the bypass flow path and returning to the fluid flow path at a secondary side of the bypass flow path, heating resistors provided respectively on an upstream side and a downstream side in a middle of the sensor flow path, and a signal output part, and outputs a signal proportional to a difference between resistance values of the upstream side and downstream side heating resistors when energized.

The control unit calculates a mass flow rate from an added output signal obtained by adding the output signals of the plurality of flow sensor units, and controls the degree of open of the adjusting valve so that the mass flow rate becomes a predetermined value.

The plurality of flow sensor units are preferably units having substantially the same characteristics as sensors. Here, examples of "units having substantially the same characteristics" include units having a common sensor flow path shape, common heating resistor specifications, and the like, units having the same manufacturer model number, and the like.

A configuration can be adopted in which the mass flow controller further comprises a body including a top surface and a bottom surface opposing each other, and side surfaces extending from the top surface toward the bottom surface side, the fluid flow path is provided in a longitudinal direction in parallel with the bottom surface, and the plurality of flow sensor units are disposed symmetrically with respect to a virtual center plane orthogonal to the bottom surface and extending in the longitudinal direction.

A configuration can be adopted in which the control unit adds the output signals of the plurality of flow sensor units in a digital signal state, and calculates a mass flow rate on the basis of a digital signal obtained by the adding.

A fluid control system of the present invention is a fluid control system comprising a plurality of fluid devices arranged therein.

The plurality of fluid devices each include any one of the mass flow controllers described above.

A semiconductor manufacturing system of the present invention comprises any one of the mass flow controllers or the fluid control system described above for controlling a process gas in a manufacturing process of a semiconductor that requires a treatment process by the process gas in a sealed chamber.

Effect of the Invention

According to the present invention, the control unit, using a plurality of thermal flow sensor units, calculates the mass flow rate from an output signal obtained by adding the output signals of the plurality of flow sensor units and thus, of the output signals, an output level of signal components having a high correlation increases while an output level of noise components having no correlation does not significantly increase and, as a result, the S/N ratio of the sensor signal can be improved.

Accordingly, even when the pressure difference between both sides of the MFC is small and the flow rate is low, a sufficient S/N ratio can be obtained.

In particular, when sensors having substantially the same characteristics as sensors are used as the plurality of flow sensor units, the effect of improving the above-described S/N ratio is maximized, and a measurement step or the like of a calibration value for each gas during manufacture of the flow sensor unit can be simplified, and thus it is advantageous in terms of manufacturing cost and manufacturing flexibility as well.

BRIEF DESCRIPTION OF THE DRAWINGS

FIG. 1 is a longitudinal sectional view illustrating an MFC according to an embodiment of the present invention.

FIG. 2 is a transverse sectional view of the MFC in FIG. 1 along line A-A.

FIG. 3 is an explanatory view illustrating a bridge circuit of a sensor unit.

FIG. 4 is a block diagram illustrating a signal processing system of a first embodiment.

DESCRIPTION OF THE PREFERRED EMBODIMENTS

First Embodiment

Figure 5:
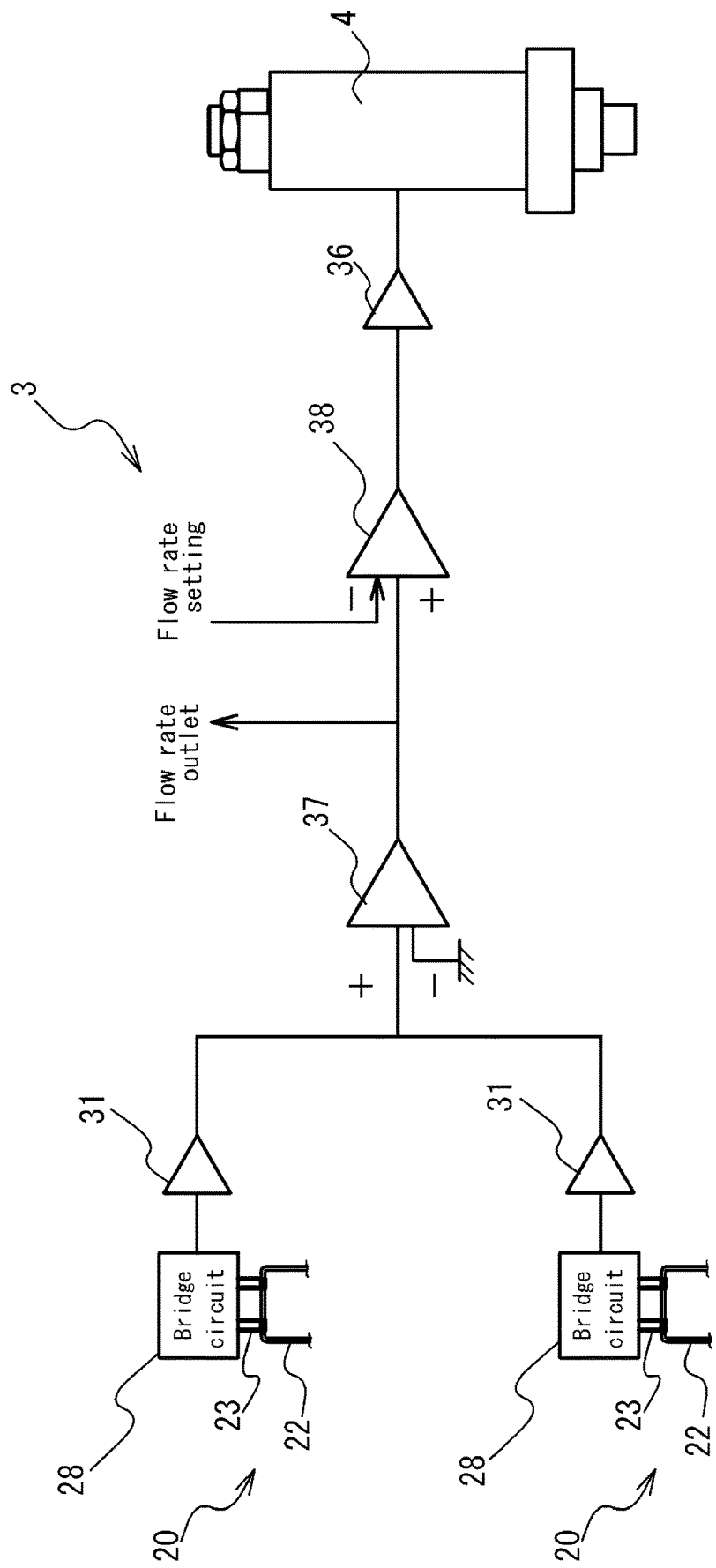
FIG. 5 is a block diagram illustrating a signal processing system of a second embodiment.

A mass flow controller (MFC) of embodiments of the present invention is described below with reference to the drawings. The present embodiment is an embodiment in which two substantially identical flow sensor units are provided, and output signals of the two sensor units are converted into digital signals and then added and processed.

FIG. 1 is a longitudinal sectional view of an MFC 1 of the present embodiment, and FIG. 2 is a transverse sectional view of a flow sensor unit portion of the MFC 1.

The MFC 1 mainly includes a body 10, a flow sensor unit 20, a control unit 3, and a flow adjusting valve 4.

The body 10 is composed of a steel material such as stainless steel, has a rectangular parallelepiped outer shape, and is provided with joints 11 to both end surfaces thereof. In the body 10, an inflow path 10a, a bypass flow path 10b, a sensor inflow path 10c, a sensor outflow path 10d, a merging flow path 10e, a valve chamber 10f, and an outflow path 10g are formed.

The fluid that has passes through the inflow path 10a flows into the bypass flow path 10b. The sensor inflow path 10c branches from the bypass flow path 10b and allows the fluid to flow to the flow sensor unit 20. The sensor outflow path 10d allows a fluid passing through the flow sensor unit 20 to flow out. In the merging flow path 10e, the fluid passing through the bypass flow path 10b and the fluid passing through the sensor outflow path 10d merge. The inflow path 10a and the merging flow path 10e are flow paths having circular cross sections with flow path center lines on the same straight line.

Further, the bypass flow path 10b and the sensor inflow path 10c are configured so that the fluid flows at a predetermined flow rate ratio (1:2 to 1:1000, for example). A plurality of bypass sheets 12 are provided in the bypass flow path 10b. A valve main body 4A of the flow adjusting valve 4 is disposed in the valve chamber 10f.

The flow sensor unit 20 is a thermal flow sensor unit, and includes a sensor base main body 21, a sensor flow path 22 composed of a thin tube, a pair of heating resistors 23a, 23b composed of heating coils wound around an upstream side and a downstream side of the sensor flow path 22, a pair of sensor flanges 24, a sensor cover 25, a pair of gaskets 26, bolts 27 serving as fastening means, and a bridge circuit 28 serving as an output part.

The bridge circuit 28, as illustrated in FIG. 3, is a circuit in which the heating resistors 23a, 23b and reference resistances R1, R2 are connected in this order in a diamond shape, and an input voltage is applied between connecting points P1 and P2, and an output voltage is obtained between connecting points P3 and P4. It should be noted that the bridge circuit 28 is physically provided on a board of the control unit 3, but is functionally considered as an output part of the flow sensor unit 20 and thus is treated as a component of the flow sensor unit 20 in this specification.

In the present embodiment, two flow sensor units 20 are provided in parallel.

The sensor flow paths 22 of these flow sensor units 20 have the same tube diameter, length, shape, and material. Further, an inflow point from the inflow path 10a of the respective sensor flow paths 22 and a merging point with the fluid flow path are set to be the same in a flow path direction.

The two flow sensor units 20, as illustrated in FIG. 2, are disposed orthogonal to a bottom surface 10h and symmetrically relative to a virtual center plane Cp extending in a longitudinal direction (that is, which is a plane including the flow path center lines of the inflow path 10a and the merging flow path 10e). That is, the two flow sensor units 20 are provided bisymmetrically in FIG. 2. This arrangement is preferred from the standpoint that, when the MFC is placed horizontally or upright in the flow path direction, gravitational forces received by both flow sensor units are the same or symmetrical, making the effects of the gravitational forces on the output signals of the respective flow sensor units 20 equal, and a noise component reducing effect resulting from adding of signals described later not impaired.

The control unit 3 calculates the flow rate of the fluid on the basis of the signals from the flow sensor units 20, and performs feedback control that outputs a control signal to the flow adjusting valve 4 so that the fluid flowing through the fluid flow path 11 has a predetermined flow rate. The control unit 3, as illustrated in FIG. 4, includes an amplifier 31, an analog-digital (AD) converter 32, an adding unit 33, a comparing control unit 34, a digital-analog (DA) converter 35, and an amplifier 36. It should be noted that the adding unit 33 and the comparing control unit 34 are programs executed by a microcomputer central processing unit (CPU), and not physical units.

The flow adjusting valve 4 is a valve that opens and closes a flow path of the fluid on the basis of control signals from the control unit 3, and composed of the valve main body 4A and a drive actuator 4B as illustrated in FIG. 1.

Next, the operation of the MFC 1 of the present embodiment thus configured will be described with reference to FIG. 3 and FIG. 4.

In each of the flow sensor units 20A, 20B, a voltage Vin is applied between the connecting points P1 and P2 of the bridge circuit 28, the heating resistors 23a, 23b on the upstream side and the downstream side are energized to generate heat, and resistance values Ra, Rb (proportional to temperature) of these heating resistors are detected. When the fluid flows in the sensor flow path 22, an increase in temperature in the heating resistor 23a on the upstream side is suppressed by being cooled by the flowing fluid, and an increase in temperature in the heating resistor 23b on the downstream side is augmented by the fluid flowing thereto that has been heated by the heating resistor 23a on the upstream side. As a result, a temperature difference occurs between the heating resistors 23a and 23b. This temperature difference can be regarded as proportional to the mass flow rate of the fluid within a certain range of flow rates. The bridge circuit 28 converts the resistance value difference Ra−Rb between the heating resistors 23a and 23b, which is an index of this temperature difference, into an output voltage Vout between the connecting points P3 and P4 and outputs the voltage Vout.

(When the reference resistance values R1, R2 are equal, Vout=Vin×(Rb−Ra)/(Ra+Rb), and Vout is substantially proportional to Rb−Ra.)

The output side signal lines from the bridge circuits 28 of the respective flow sensor units 20A, 20B are input to the amplifiers 31 composed of an operational amplifier as illustrated in FIG. 3. Each amplified output signal is digitized by the AD converter 32 and added by the adding unit 33. The signal (digital data) obtained by the adding is further processed to calculate the flow rate value. The calculated flow rate value is input into the comparing control unit 34.

It should be noted that, when a process of dividing by two is additionally performed immediately after the adding process by the adding unit 33, the process becomes equivalent to calculating the average of both output signals. Further, also in a case of constituting a Kalman filter and inputting both output signals to estimate and output a flow rate value, when the two sensors have the same characteristics, the system becomes equivalent to that constituting the Kalman filter and inputting the sum of the two measured values to obtain the flow rate value as a Kalman gain calculation result.

The comparing control unit 34 compares the calculated flow rate value with a set flow rate value input from an external controller (not illustrated), and outputs a control signal. This control signal may be a simple difference signal between the calculated flow rate value and the set flow rate value, but is preferably a proportional-integral-differential (PID) control signal based on the difference, the integration and differentiation of the difference.

This control signal is converted into an analog voltage by the DA converter 35 and further amplified by the amplifier 36 composed of an operational amplifier to drive the flow adjusting valve 4.

With such feedback control performed, the mass flow rate of the fluid flowing through the MFC is adjusted to a predetermined value.

In the present invention, a signal obtained by adding the output signals of two substantially identical flow sensors is used. In this case, the reason why the S/N ratio of the signal is improved is as described below.

The actual measurement value of one sensor at a certain point in time is considered to be the sum of a signal and a noise.

Given $\mu X$ as a true value to be obtained when there is zero noise, the probability distribution of an actual measurement value X can be sufficiently approximated by a normal distribution having an average value $\mu X$ and a variance $\sigma X$.

$$X = N(\mu X, \sigma X) = \mu X + N(0, \sigma X)$$

When this is seen as having a noise $N(0, \sigma X)$ of normal distribution around the signal $\mu X$, the S/N ratio of X is obtained by dividing the a power of the signal by the variance of the noise, and expressed as follows:

$$S/N = \mu X2/\sigma X2 \tag{1}$$

Next, the signal X+Y obtained by adding the output values of a sensor x and a sensor y is considered in the same way.

When the sensor x and the sensor y have the same characteristics, that is, when μX=μY and σX=σY are satisfied, the S/N ratio of the signal obtained by adding is as follows:

$$S/N=(\mu X+\mu X)2/(\sigma X2+\sigma X2)=(2\mu X)2/2\sigma X2=2(\mu X2/\sigma X2) \quad (2)$$

Here, it is assumed that the noise of the sensor x and the noise of the sensor y are independent, and that the variance of X+Y becomes σx+σy.

Compared with the equation (1), it is understood that the S/N ratio is improved by a factor of two compared to when there is one sensor. This is an improvement by a factor of two in power, and thus is equivalent to an improvement by a factor of √2 in voltage amplitude and approximately 3 dB in decibels.

While it is understood from the same calculations that this S/N ratio improvement effect is exhibited even when the two sensors have different S/N ratios, this effect is greatest when the two sensors have the same characteristics.

Second Embodiment

The present embodiment is an embodiment in which signal processing in the control unit is performed by an analog circuit. The configuration other than this point is the same as that of the first embodiment, and thus descriptions thereof are omitted.

The configuration and signal processing operation of the control unit 3 of the MFC 1 of the present embodiment will be described with reference to FIG. 4.

The control unit 3 of the present embodiment includes the amplifier 31, an adding circuit 37, a comparing control circuit 38, and the amplifier 36.

The configuration and operation of the respective flow sensor units 20A, 20B and the bridge circuits 28 thereof are the same as those in the first embodiment, and thus descriptions thereof are omitted here.

The output side signal lines from the bridge circuits 28 of the respective flow sensor units 20A, 20B are input to the amplifiers 31 each composed of an operational amplifier as illustrated in FIG. 4. Amplified output signals are added by the adding circuit 37 composed of an operational amplifier. The signal (analog signal) obtained by the adding is externally output as a flow measurement value and also input to the comparing control circuit 38.

The comparing control circuit 38 is composed of an operational amplifier, compares the calculated flow rate value with a set flow rate value input from an external controller (not illustrated) as an analog signal, and outputs a control signal. This control signal may be a simple difference signal between the calculated flow rate value and the set flow rate value, but preferably the control signal is a PID control signal based on the difference, the integration and differentiation of the difference obtained by providing a differentiation circuit and an integration circuit (both not illustrated).

This control signal is further amplified by the amplifier 36 composed of an operational amplifier to drive the flow adjusting valve 4.

With such control performed, the mass flow rate of the fluid flowing through the MFC is adjusted to a predetermined value.

In this embodiment as well, a signal obtained by adding the output signals of two flow sensors is used, and thus the S/N ratio of the signal is improved.

In each of the above-described embodiments, a signal obtained by adding the output signals of two flow sensors is used. However, it should be noted that three or more identical flow sensors may be used, and the output signals thereof may be added to calculate the flow rate. When N identical flow sensors are used, the S/N ratio of power is improved by a factor of N, and the S/N ratio of voltage amplitude is improved by a factor of √N and decibels are improved by 10 log 10 N, from the equation (2) described above.

Further, in each of the above-described embodiments, a signal obtained by adding the output signals of two flow sensors having substantially the same characteristics is used. However, a plurality of flow sensors having different characteristics may be used. Even with sensors having different characteristics, the correlation between signal components is higher than the correlation between noise components, and thus a certain degree of an S/N ratio improvement effect can be obtained by adding the signals.

Further, while the adding unit 33 and the comparing control unit 34 are configured by programs executed by the microcomputer CPU in the first embodiment and by analog circuits such as the adding circuit 37 and the comparing control circuit 38 in the second embodiment, the present invention is not limited thereto. For example, the adding unit may be configured by an analog circuit such as the adding circuit 37, and the comparing control unit 34 may be configured by a program executed by the microcomputer CPU.

Next, a fluid control system of the present invention will be described.

Figure 6:
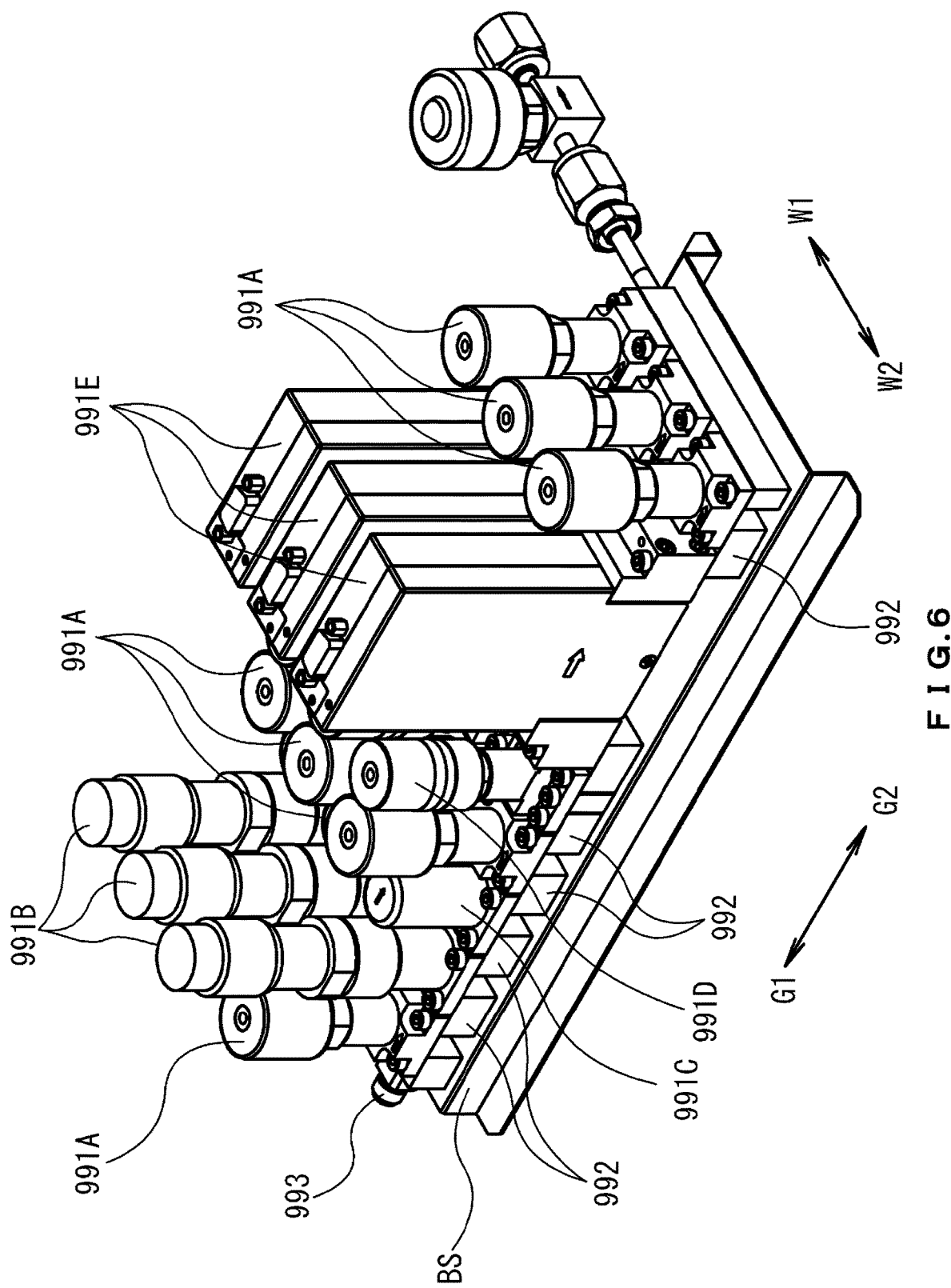
FIG. 6 is a schematic perspective view illustrating a fluid control system according to an embodiment of the present invention.

FIG. 6 is a schematic perspective view of a fluid control system according to an embodiment of the present invention.

In the fluid control system illustrated in FIG. 6, there is provided a base plate BS made of metal, arranged in width directions W1, W2, and extending in longitudinal directions G1, G2. It should be noted that W1, W2, G1, and G2 denote front side, back side, upstream side, and downstream side directions, respectively. In the base plate BS, various fluid devices 991A to 991E are installed via a plurality of flow path blocks 992, and flow paths (not illustrated) through which a fluid flows from the upstream side G1 toward the downstream side G2 are respectively formed in the plurality of flow path blocks 992.

Here, "fluid device" is a device used in a fluid control system for controlling a flow of a fluid, and including a body defining a fluid flow path, and at least two flow path ports that open at a surface of this body. Specifically, the fluid device includes the switch valve (two-way valve) 991A, the regulator 991B, the pressure gauge 991C, the switch valve (three-way valve) 991D, the mass flow controller 991E, and the like, but is not necessarily limited thereto. It should be noted that an introducing pipe 993 is connected to each of the flow path ports on the upstream side of the flow path (not illustrated) described above.

The present invention is applicable to the mass flow controller 991E described above.

Next, a semiconductor manufacturing system of the present invention will be described.

Figure 7:
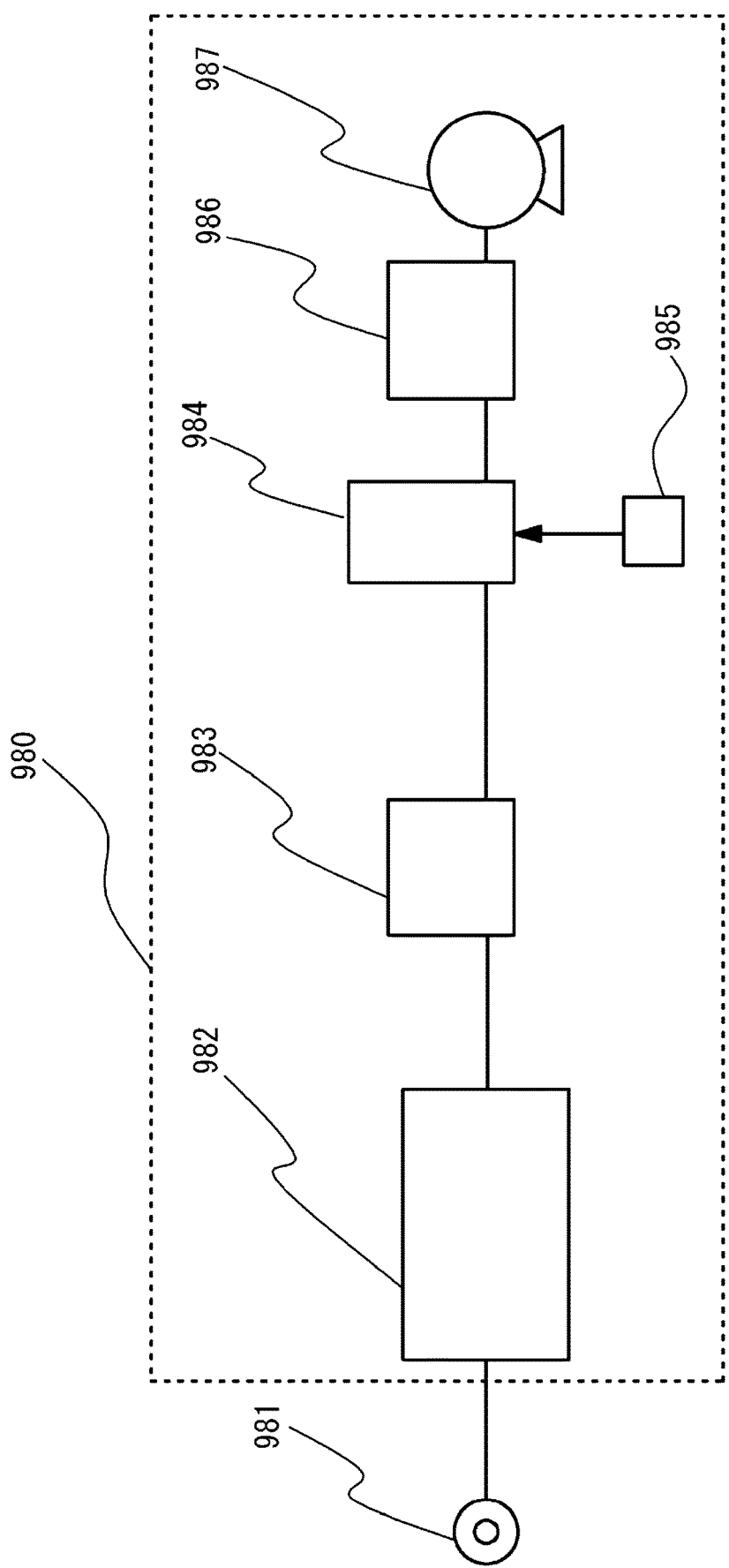
FIG. 7 is a block diagram illustrating a semiconductor manufacturing system according to an embodiment of the present invention.

FIG. 7 is a block diagram of a semiconductor manufacturing system according to an embodiment of the present invention.

A semiconductor manufacturing system 980 illustrated in FIG. 7 is a system for executing a semiconductor manufacturing process by an atomic layer deposition (ALD) method, with 981 denoting a process gas supply source, 982 denoting a gas box, 983 denoting a tank, 984 denoting a switch valve, 985 denoting a control unit, 986 denoting a processing chamber, and 987 denoting an exhaust pump. For example, in an ALD method or the like, a process gas used in a treatment process that deposits a film on a substrate needs to be supplied in a stable manner at a higher flow rate.

The gas box 982 is an integrated gas system (a fluid control system) in which various fluid devices, such as a switch valve, a regulator, and a mass flow controller, are integrated and housed in a box to supply an accurately measured process gas to the processing chamber 986.

The tank 983 functions as a buffer for temporarily storing the process gas supplied from the gas box 982.

The switch valve 984 is a diaphragm valve.

The control unit 985 controls flow regulation by controlling the supply of the operation gas to the switch valve 984.

The processing chamber 986 provides a sealed treatment space for forming a film on the substrate by the ALD method.

The exhaust pump 987 draws a vacuum inside the processing chamber 986.

The present invention is applicable to a mass flow controller serving as a component of the gas box 982 (fluid control system) described above.

According to a system configuration such as described above, flow control of the process gas is possible by sending an instruction for control from the control unit 985 to the gas box 982 and the switch valve 984.

It should be noted that the present invention is not limited to the aforementioned embodiments. Those skilled in the art can make various additions and modifications within the scope of the present invention.

DESCRIPTIONS OF REFERENCE NUMERALS

1 Mass flow controller (MFC)
3 Control unit
4 Flow adjusting valve
4A Valve main body
10 Body
11 Joint
10a Inflow path
10b Bypass flow path
10c Sensor inflow path
10d Sensor outflow path
10e Merging flow path
10f Valve chamber
10g Outflow path
12 Bypass sheet
20, 20A, 20B Flow sensor unit
21 Sensor base main body
22 Sensor flow path
23a, 23b Heating resistor (Heating coil)
24 Sensor flange
25 Sensor cover
26 Gasket
27 Bolt
28 Bridge circuit
31 Amplifier
32 AD converter
33 Adding unit
34 Comparing control unit
35 DA converter
36 Amplifier
37 Adding circuit
38 Comparing control circuit
980 Semiconductor manufacturing system
981 Process gas supply source
982 Gas box
983 Tank
984 Switch valve
985 Control unit
986 Processing chamber
987 Exhaust pump
991A to 991E Fluid device
992 Flow path block
993 Introducing pipe
BS Base plate
G1, G2 Longitudinal direction
L0 Initial length
L1 Length of first piezoelectric actuator
L2 Length of second piezoelectric actuator
W1, W2 Width direction

What is claimed is:

1. A mass flow controller comprising:
   a fluid flow path that allows a fluid to pass therethrough;
   a plurality of flow sensors that measure a mass flow rate of the fluid passing through the fluid flow path;
   an adjusting valve that adjusts a flow rate of the fluid passing through the fluid flow path; and
   a controller configured to control a degree of open of the adjusting valve so that the mass flow rate of the fluid measured by the flow sensors becomes a predetermined value, wherein
   the fluid flow path includes a bypass flow path constituting a portion thereof,
   the flow sensors each include a sensor flow path branching at a primary side of the bypass flow path and returning to the fluid flow path at a secondary side of the bypass flow path, heating resistors provided respectively on an upstream side and a downstream side in a middle of the sensor flow path, and a signal output part, and outputs a signal proportional to a difference between resistance values of the upstream side and downstream side heating resistors when energized, and
   the controller is configured to calculate a mass flow rate from an added output signal obtained by adding the output signals of the plurality of flow sensors, and to control the degree of open of the adjusting valve so that the mass flow rate becomes a predetermined value.

2. The mass flow controller according to claim 1, wherein the plurality of flow sensors have substantially the same characteristics as sensors.

3. The mass flow controller according to claim 1, further comprising:
   a body including a top surface and a bottom surface opposing each other, and side surfaces extending from the top surface toward the bottom surface side, wherein
   the fluid flow path is provided in a longitudinal direction in parallel with the bottom surface, and
   the plurality of flow sensors are disposed symmetrically with respect to a virtual center plane orthogonal to the bottom surface and extending in the longitudinal direction.

4. The mass flow controller according to claim 1, wherein the controller is configured to add the output signals of the plurality of flow sensors in a digital signal state, and to calculate a mass flow rate on the basis of a digital signal obtained by the adding.

5. A fluid control system comprising a plurality of fluid devices arranged therein, wherein
   the plurality of fluid devices each include the mass flow controller as defined in claim 1.

6. A semiconductor manufacturing system comprising the mass flow controller as defined in claim 1 to control a process gas in a manufacturing process of a semiconductor that requires a treatment process by the process gas in a sealed chamber.

\* \* \* \* \*